W. J. HOPE.
COMB AND BRUSH.
APPLICATION FILED JUNE 21, 1911.

1,010,913.

Patented Dec. 5, 1911.

WITNESSES

INVENTOR
WILLIAM J. HOPE
BY Munn & Co.
ATTORNEYS

UNITED STATES PATENT OFFICE.

WILLIAM J. HOPE, OF TUNICA, MISSISSIPPI.

COMB AND BRUSH.

1,010,913.  Specification of Letters Patent.  Patented Dec. 5, 1911

Application filed June 21, 1911. Serial No. 634,397.

*To all whom it may concern:*

Be it known that I, WILLIAM J. HOPE, a citizen of the United States, and a resident of Tunica, in the county of Tunica, State of Mississippi, have invented a new and useful Improvement in Combs and Brushes, of which the following is a specification.

My invention is an improvement in a comb and brush, and has for its object the provision of a simple, compact, and cheaply constructed device combining the functions of both instruments which will be capable of being carried in the pocket, will not easily collect dirt, and which may be easily cleaned when desired.

Figure 1:
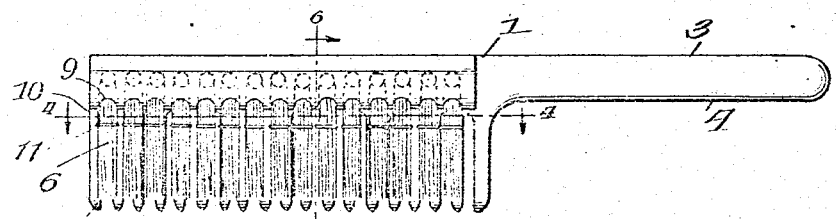
Figure 2:
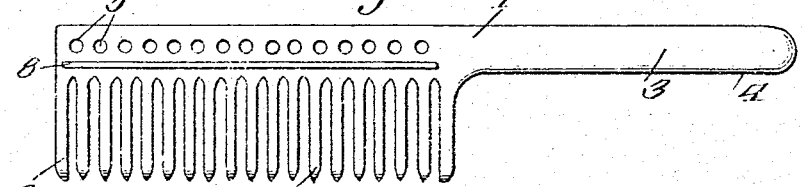
Figure 3:
Figure 4:
Figure 7:
Figure 5:
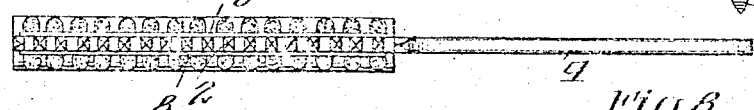
Figure 6:
Figure 8:
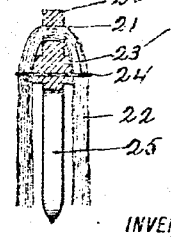

In the drawings: Figure 1 is a side view of the improvement, Fig. 2 is a similar view with the bristles removed, Fig. 3 is a top plan view, Fig. 4 is a section on the line 4—4 of Fig. 1, Fig. 5 is a bottom plan view, Fig. 6 is a section on the line 6—6 of Fig. 1, Fig. 7 is a similar section of a modified form, and Fig. 8 is a similar section of another modification.

The present embodiment of the invention comprises a base or body 1 of suitable material, such as horn, hard rubber, celluloid or metal, which is provided with a plurality of spaced parallel and laterally extending teeth 2 at one end, and at the other with a handle 3.

The teeth may be of any desired conformation and may be spaced at different distances in different articles, to suit the various users. It is evident that the article may also be made with teeth of various lengths for the same reason, and the body may be suitably ornamented. In the present construction the teeth extend over approximately half the length of the article, and the handle extends over the remaining length of the article. The handle is rounded and shaped to fit the hand on the edge adjacent to the teeth, as indicated at 4.

The body is provided with a longitudinal series of spaced transverse openings 5 between the connection of the teeth to the body and the opposite edge of the body, the series extending the full length of that portion of the body having the teeth. A tuft 6 of bristles is passed through each of the openings 5, and the bristles of each tuft extend on both sides of the body an approximately equal distance. Each tuft has its ends bent laterally in the same direction, as shown more particularly in Fig. 6. A rib 8 is arranged on each side of the body between the series of openings and the base of the teeth, and the bristles are held in the position shown, by means of a holding plate 7. The said plate is shaped to fit that portion of the body above the bristles, and the sides of the plate are bent outwardly around the bend of the bristles and the free edges of the plate are provided with scallops 9 for receiving the bristles. Those portions 10 of the plate between the scallops engage between the tufts of bristles, thus properly spacing the said tufts, while the scallops hold the bristles in position substantially parallel with the teeth.

As shown in Figs. 1 and 4, a holding wire 11 is made use of, which is passed around the bristles between the teeth. This holding wire may be dispensed with, if desired, as shown in Fig. 5, wherein the holding plate 7 is used without the wire.

In the modified form shown in Fig. 7, the body 12 is provided with the openings 13 for receiving the tufts 14 of bristles, and a holding plate 15 is bent over the body, and down upon the ends of the tufts to hold the bristles in substantial parallelism with the teeth 16. The side edges of the plate are scalloped as shown, and that portion 17 of the edge between the scallops is bent inward between the tufts to properly space the same from each other.

In Fig. 8, the holding plate is omitted. In this form, the body 20 is provided with openings 21 through which the bristles 22 are passed. The ribs 23 are integral with the body, and the bristles are held in place by holding wires 24, similar to the wires 11 and arranged in the same manner. The bristles extend alongside the teeth 25, and are of somewhat less length.

The ribs 8 are integral with the body, and the holding plate retains its position, and retains the bristles in position by its rigidity.

In use, the device is handled in the same manner as an ordinary comb. As the teeth pass through the hair, the bristles smooth the hair both in front and behind the teeth. Either set of bristles may be used alone by inclining the comb, or the teeth of the comb may be used with both. It will be noticed that only a slight portion of the length of the teeth extends below the bristles.

I claim:—

1. As an article of manufacture, a comb and a brush comprising a body having one end formed into a handle and having a series of spaced substantially parallel laterally extending teeth, and provided with a longitudinal series of spaced transverse openings between the teeth and the adjacent edge of the body, a tuft of bristles in each opening, and extending on both sides of the body, a plate doubled over the body, each edge of the plate engaging the adjacent ends of the tufts near the opening, the edges of the plate being scalloped to receive the tufts, and a portion of the plate between the scallops being bent in between the tufts, the said plates holding the ends of the bristles substantially parallel with the teeth, and a flexible strand passed between the teeth and over the bristles to hold the tufts in place.

2. As an article of manufacture, a comb and a brush comprising a body having one end formed into a handle and having a series of spaced substantially parallel laterally extending teeth, and provided with a longitudinal series of spaced transverse openings between the teeth and the adjacent edge of the body, a tuft of bristles in each opening, and extending on both sides of the body, a plate doubled over the body, each edge of the plate engaging the adjacent ends of the tufts near the opening, the edges of the plate being scalloped to receive the tufts, and a portion of the plate between the scallops being bent in between the tufts, the said plates holding the ends of the bristles substantially parallel with the teeth.

3. As an article of manufacture, a comb and a brush comprising a body having one end formed into a handle and having a series of spaced substantially parallel laterally extending teeth, and provided with a longitudinal series of spaced transverse openings between the teeth and the adjacent edge of the body, a tuft of bristles in each opening, and extending on both sides of the body, a plate doubled over the body, each edge of the plate engaging the adjacent ends of the tufts near the opening, the edges of the plate being scalloped to receive the tufts.

4. As an article of manufacture, a comb and a brush comprising a body having one end formed into a handle and having a series of spaced substantially parallel laterally extending teeth, and provided with a longitudinal series of spaced transverse openings between the teeth and the adjacent edge of the body, a tuft of bristles in each opening, and extending on both sides of the body, a plate doubled over the body, each edge of the plate engaging the adjacent ends of the tufts near the opening.

5. As an article of manufacture, a comb and a brush comprising a body having one end formed into a handle and having a series of spaced substantially parallel laterally extending teeth, and provided with a longitudinal series of spaced transverse openings between the teeth and the adjacent edge of the body, a tuft of bristles in each opening, and extending on both sides of the body, and means on each side of the body for holding the ends of the tufts substantially parallel with the teeth.

6. As an article of manufacture, a comb having a longitudinal series of transverse openings between the teeth and the opposite side edge, and a tuft of bristles in each opening, the ends of the bristles extending substantially parallel with the teeth.

WILLIAM J. HOPE.

Witnesses:
J. H. HARRIS,
L. E. MITCHELL.